(12) United States Patent
Weber

(10) Patent No.: US 6,776,949 B2
(45) Date of Patent: Aug. 17, 2004

(54) POLYMER WELDING USING FERROMAGNETIC PARTICLES

(75) Inventor: Jan Weber, Maple Grove, MN (US)

(73) Assignee: SciMed Life Systems, Inc., Maple Grove, MN (US)

( * ) Notice: Subject to any disclaimer, the term of this patent is extended or adjusted under 35 U.S.C. 154(b) by 0 days.

(21) Appl. No.: 10/109,518

(22) Filed: Mar. 28, 2002

(65) Prior Publication Data

US 2003/0183986 A1 Oct. 2, 2003

(51) Int. Cl.[7] .......... B29C 65/14; B29C 33/06
(52) U.S. Cl. .......... 264/402; 264/249; 264/403; 264/404; 264/486; 264/487; 264/491; 156/245; 156/272.4; 425/174.8 R
(58) Field of Search .......... 204/403, 404, 204/486, 487, 489, 490, 491, 249, 447; 156/272.4, 275.7, 245; 425/174.8 R; 264/403, 404, 486, 487, 489, 490, 491, 249, 447, 402

(56) References Cited

U.S. PATENT DOCUMENTS

| | | | | |
|---|---|---|---|---|
| 3,620,876 A | * | 11/1971 | Guglielmo et al. .......... | 156/272 |
| 3,993,529 A | * | 11/1976 | Farkas .......... | 156/380 |
| 4,035,547 A | * | 7/1977 | Heller, Jr. et al. .......... | 428/329 |
| 4,093,484 A | * | 6/1978 | Harrison et al. .......... | 156/244.13 |
| 5,352,871 A | * | 10/1994 | Ross et al. .......... | 219/633 |
| 5,762,741 A | | 6/1998 | Kodokian | |
| 6,056,844 A | | 5/2000 | Guiles et al. | |
| 6,137,093 A | | 10/2000 | Johnson, Jr. | |
| 6,248,196 B1 | | 6/2001 | Waitz et al. | |
| 6,352,779 B1 | | 3/2002 | Edwards et al. | |
| 2003/0055449 A1 | | 3/2003 | Lee et al. | |

FOREIGN PATENT DOCUMENTS

| | | | |
|---|---|---|---|
| DE | 199 54 960 A1 | * | 6/2000 |
| EP | 0 355 423 A2 | * | 2/1990 |
| EP | 0 525 069 B1 | * | 3/1996 |
| WO | WO 80/02124 | * | 10/1980 |
| WO | WO 99/03306 | * | 1/1999 |
| WO | WO 03/035161 A1 | | 5/2003 |

OTHER PUBLICATIONS

U.S. patent application Ser. No. 10/375,719, Chen, filed Feb. 25, 2003.

International Search Report; PCT US 03/09494, report mailed Jun. 9, 2003.

Pierce, J.P., Abstract, Table of Contents, and Chapter 1: "Introduction to Magnetic Nanostructures" in "Tailored Magnetic Nanostructures on Surfaces," available at http://web.utk.edu/~jp/thesisJP.htm, May 2003.

* cited by examiner

Primary Examiner—Stefan Staicovici
(74) Attorney, Agent, or Firm—Marshall, Gerstein & Borun LLP

(57) ABSTRACT

An apparatus and method for bonding polymeric materials is provided. The apparatus and method both utilize ferromagnetic materials in association with the polymeric materials to be bonded together. The polymeric materials, and the ferromagnetic material, are placed within a magnetic field, which causes hysteresis losses in the ferromagnetic field, and thus elevation in the temperature of both the ferromagnetic material and the polymeric materials to the point where the polymeric materials melt and fuse together. The ferromagnetic materials only rise in temperature to their Curie temperatures, at which point the hysteresis losses cease, and the polymeric material stops being heated. Removing the electromagnetic field allows for cooling and fusing.

24 Claims, 2 Drawing Sheets

POLYMER WELDING USING FERROMAGNETIC PARTICLES

BACKGROUND OF THE DISCLOSURE

The disclosure generally relates to bonding techniques and, more particularly, relates to methods and apparatus for bonding polymeric materials.

FIELD OF THE DISCLOSURE

Bonding or welding of two or more polymeric components can be accomplished according to a variety of methods. For example, in the construction of medical devices, such as balloon catheters, or the like, it is known to bring the polymeric components of the catheter into contact with a medium which is at the melting temperature of the polymers. More specifically, the polymeric components can be placed within a heated clam shell, or mold-type of device, which surrounds the polymeric material, and transfers heat from the material of the clam shell to the material of the polymeric component. Alternatively, the polymeric materials can be exposed to a hot air stream which is at a temperature sufficient to melt the polymer. A disadvantage of such systems is the time required to bring the polymer to a molding temperature is so great that the transferred heat tends to dissipate throughout the polymeric material and to any adjoining areas of the device. It is therefore difficult to restrict the area affected by the heat.

According to other techniques, it is known to expose a form of energy to the welding area to heat the polymeric material either by direct absorption by the polymeric material, or indirectly, by adding an energy-absorbing additive through the polymer. For example, with regard to laser welding, it is known to disperse an additive throughout the polymeric material which is adapted to absorb the laser frequency. The polymeric material is heated by the hysteresis losses resulting from the laser frequency absorbing additive. While the polymeric material can be heated quickly according to such a method, and the welding spot can be precisely located by direct placement of the energy-absorbing additive, it is difficult to control the temperature accurately.

In still further systems, it is known to add ferromagnetic materials to the polymeric materials and then expose the combined materials to an electromagnetic field. The polymeric material is thereby heated due to hysteresis losses associated with the vibrating ferromagnetic materials. Moreover, one advantage of such a system over the above-referenced laser welding system, is that temperatures can be more accurately controlled due to the fact that the hysteresis losses will only occur up to the Curie temperature of the ferromagnetic material. By selecting a ferromagnetic material with a Curie temperature equal to a point at which the polymeric materials will bond, it is possible to heat and bond the polymeric materials, without damage to the polymeric materials due to overheating of the material. Moreover, the materials can be heated quickly with such a system.

Additionally, the electromagnetic field can pass through all polymers and therefore heat ferromagnetic material placed on the inside of such structures, therefore enabling heating from the inside out.

While such systems are effective, the addition of the ferromagnetic material to the device being created, has certain inherent drawbacks. For example, the particle size of the ferromagnetic materials currently in use, which are on the order of at least one micron, is such that the particles themselves are often as thick as the walls or individual polymer layers of the devices being created, thereby creating weak spots due to a lack of a chemical connection between the polymer matrix and the ferromagnetic particles. The addition of the ferromagnetic material will also often stiffen the bond site, a disadvantage when the medical device being created must be flexible. A disadvantage of large (i.e., larger than one micron) ferromagnetic particles is the relatively small surface-to-volume ratio in comparison to smaller nano-sized ferromagnetic particles.

SUMMARY OF THE DISCLOSURE

In accordance with one aspect of the disclosure, a method of bonding multiple polymeric elements is provided. The method may comprise the steps of distributing ferromagnetic particles through a molding device, placing multiple polymeric elements into operative association with the molding device, exposing the molding device to an electromagnetic field, and heating any polymeric elements by way of contact with the molding device.

In accordance with another aspect of the disclosure, a method of bonding multiple polymeric elements together is provided. The method may comprise the steps of providing a first polymeric element, providing a second polymeric element, applying a material containing ferromagnetic particles to an outside surface of at least one of the first and second polymeric elements, engaging the first and second polymeric elements with the material containing ferromagnetic particles being placed between the first and second polymeric elements, and exposing the material containing ferromagnetic particles to an electromagnetic field. The exposure causes the material to rise in temperature and thereby fuse the first and second polymeric elements together.

In accordance with another aspect of the disclosure, an apparatus for bonding first and second polymeric elements together is provided. The apparatus may comprise a molding element with a surface complementary to at least one of the first and second polymeric elements, ferromagnetic particles operatively associated with the molding element, and a magnetic field source to subject the molding element to a magnetic field. The molding element surface is adapted to engage at least one of the first and second elements.

These and other aspects and features of the disclosure will become more apparent from the following detailed description, when taken in conjunction with the accompanying drawings.

Figure 1:
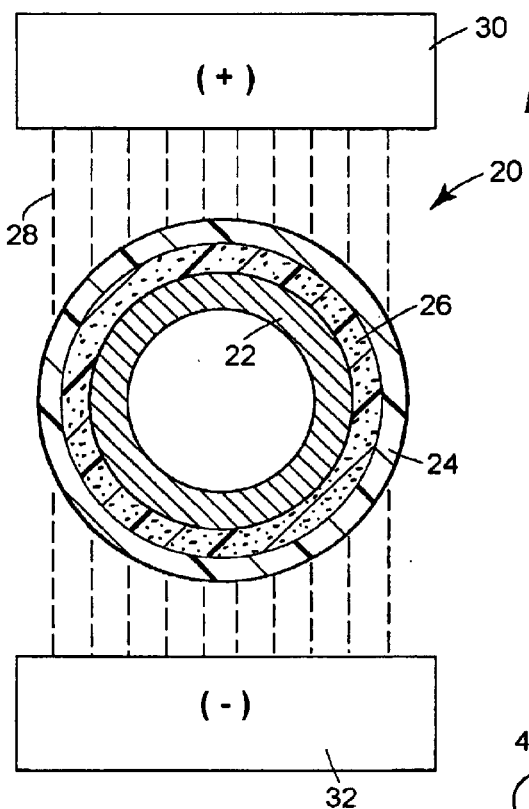
FIG. 1 is the diagrammatic cross-sectional view of the apparatus according to the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific examples disclosed, but on the contrary, the intention is to cover all modifications, alternative constructions, and equivalents falling within the spirit and scope of the disclosure as defined by the appended claims.

DETAILED DESCRIPTION

Referring now to the drawings and with specific reference to FIG. 1, a bonding apparatus constructed in accordance with the teachings of the disclosure is generally referred to by reference numeral 20. The following disclosure will be provided with specific reference to the bonding of polymeric materials for the creation of medical devices such as balloon catheters, but it is to be understood that the bonding methods and apparatus disclosed herein can be used for the creation of multiple other devices including other medical devices.

In the embodiment depicted in FIG. 1, a first polymeric material 22, which may be the inner lining of a balloon catheter, is shown being bonded to a second polymeric material 24, which may be the outer surface of a balloon catheter. Without limiting the disclosure to the specific polymers referenced herein, suitable polymers for such usage include polytetrafluoroethylene (PTFE), polytetrafluoroethylene copolymer, tetrafluoro ethylene (TFE), polyvinylidine fluoride (PVDF), polyamides, polyamide/ether block copolymers, polyester/ether block copolymers, polyethylene terephthalate (PET), polyethylene napthalene-dicarboxylate (PEN), polyethylene, and Nylon 12, as well as many other types of thermoplastic or thermo-set polymers.

In the depicted embodiment of FIG. 1, a coating of ferromagnetic material 26 is provided between the first and second polymers 22, 24. Many ferromagnetic particles are suitable for such use, but can be provided in nanosized particles made of compositions of magnetite in the form of $Fe_3O_4$, $Fe_2O_3$, $Cr_2O_3$ and $FeCr_2O_4$. The specific composition of the nano-particle made out of alloys of such materials defines the Curie temperature. During the production process of these nano-particles, the specific ratio of the oxides is determined by the oxygen flow. For example, in making $Fe_xO_y$ nano-particles, one is able to increase the ratio $Fe_2O_3 \backslash Fe_3O_4$ by increasing the oxygen flow and vice versa. Such nano-particles have been found to be advantageous due to, among other things, their relatively small particle size, which is typically on the order of 5–10 nanometers. Such sizes are advantageous in the formation of relatively small medical devices to avoid the creation of the weak spots referenced above, and also to result in better heat transfer from the embedded particles to the surrounding polymer matrix due to their large surface-to-volume ratio. When embedded inside a polymer matrix, it is advantageous to have a chemical connection between the particles and the matrix.

As also shown in FIG. 1, a magnetic field 28 is created by an anode 30 and a cathode 32. Of course, the magnetic field 28 can be created by any other suitable form of apparatus. The first and second polymeric materials 22, 24 and the ferromagnetic material 26 form an assembly 33 placed within the magnetic field 28.

Figure 3:
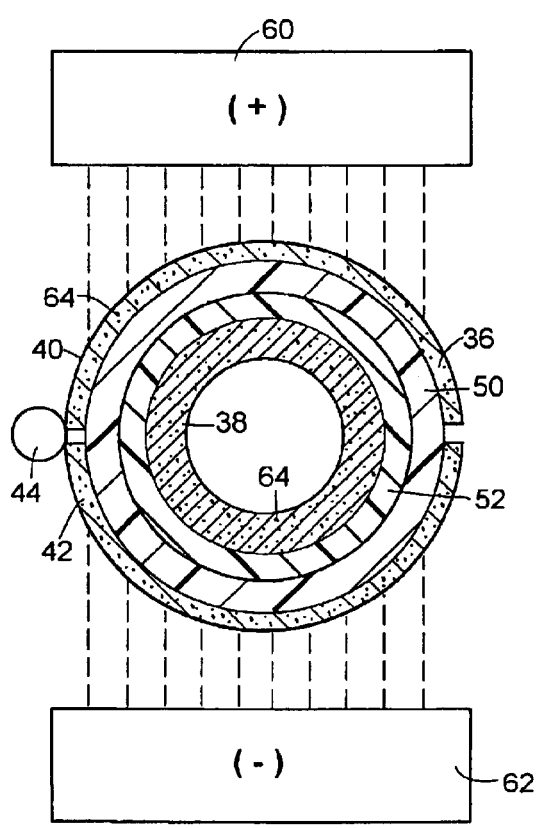
FIG. 3 is a diagrammatic cross-section of a second alternative embodiment of an apparatus constructed in accordance with the teachings of the disclosure.
Figure 2:
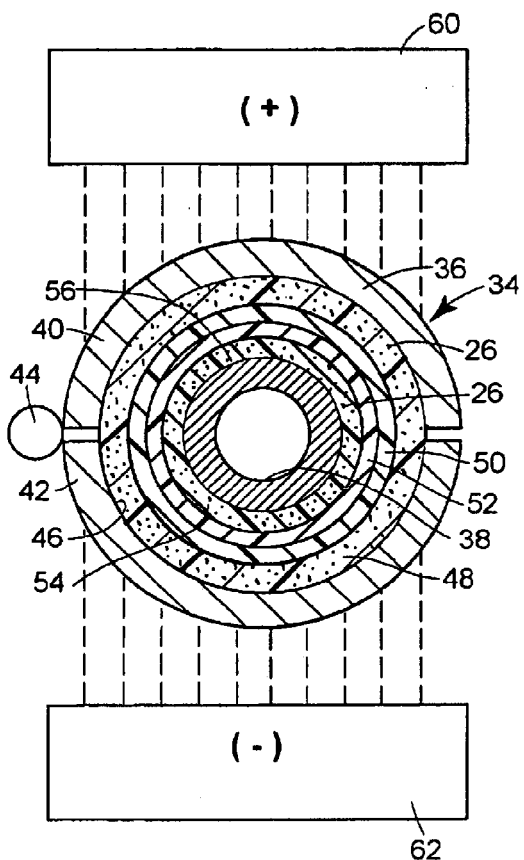
FIG. 2 is a diagrammatic cross-section of an alternative embodiment of an apparatus constructed in accordance with the teachings of the disclosure.

The embodiments of FIGS. 2 and 3 are dissimilar to that of FIG. 1 in that the ferromagnetic material 26 is not divided between the polymeric materials 22, 24 and, thus, does not remain within the created medical device. Rather, as shown first with regard to FIG. 2, the ferromagnetic material 26 is provided as an outer layer of a molding device 34. The molding device 34 can be provided in a number of forms, but as depicted in FIG. 2, includes a clam shell 36 and a mandrel 38. The clam shell 36 may include first and second complementary sections 40, 42 joined by a hinge 44. Accordingly, it can be seen that the clam shell sections 40, 42 can be pivoted about the hinge 44 to allow for access of the first and second polymeric materials 22, 24 into and out of the clam shell 36. Each of the clam shell sections 40, 42 include an interior surface 46 upon which is coated a layer of ferromagnetic material 48. The shape of the clam shell sections 40, 42 as well as the interior surfaces 46 are so as to be congruent with the outer shape of the first polymeric material 50. Radially inward and adjacent to the first polymeric material 50 is a second polymeric material 52, which rests against a second layer of ferromagnetic material 54. The second layer of ferromagnetic material 54 is coated on an outer surface 56 of the mandrel 38. Accordingly, it can be seen that the first and second polymeric materials 50, 52 are supported both from the outside by the clam shell 36, and from the inside by the mandrel 38. Moreover, due to the provision of first and second layers of ferromagnetic material 48, 54, the heat created thereby, when exposed to a magnetic field 58, is able to be more quickly dissipated through the first and second layers of polymeric material 50, 52. Again, the magnetic field 58 can be created by an anode and a cathode (60, 62), or by any other suitable form of magnetic field creation.

The embodiment of FIG. 3 is similar to that of FIG. 2, but for the provision of magnetic material 64 directly within the clam shell 36, and the mandrel 38. Accordingly, wherein like elements are depicted, like reference numerals are employed. Such an embodiment could be provided by casting the clam shell sections 40, 42 from molten material containing the ferromagnetic material therein, or any other suitable formation technique.

In any of the aforementioned embodiments, it is possible to tailor the combination of elements to provide ferromagnetic material in only those positions where it is desired. For example, while not depicted in cross-sectional views of FIGS. 1–3, it will be readily understood by one of ordinary skill in the art, that the ferromagnetic material could be provided in the form of a plurality of rings longitudinally spaced along the first and second polymeric layers. Alternatively, if the first and second polymeric materials are only to be bonded in certain sections, the ferromagnetic material can be placed in only those positions where the bonding is desired.

Figure 4:
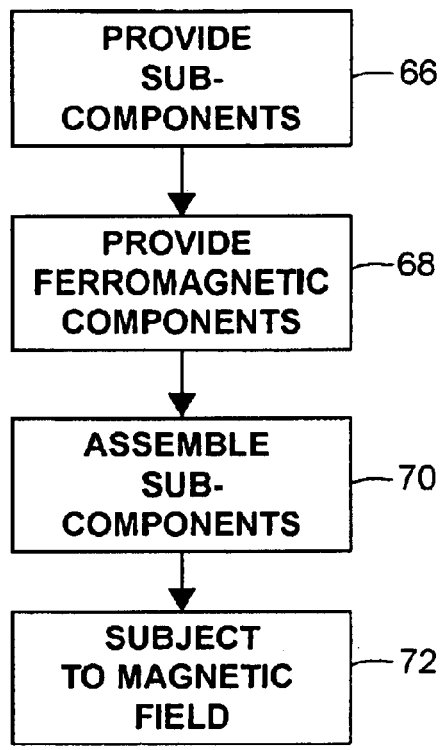
FIG. 4 is a flow chart depicting sample steps which may be taken according to a first method taught by the disclosure.
Figure 5:
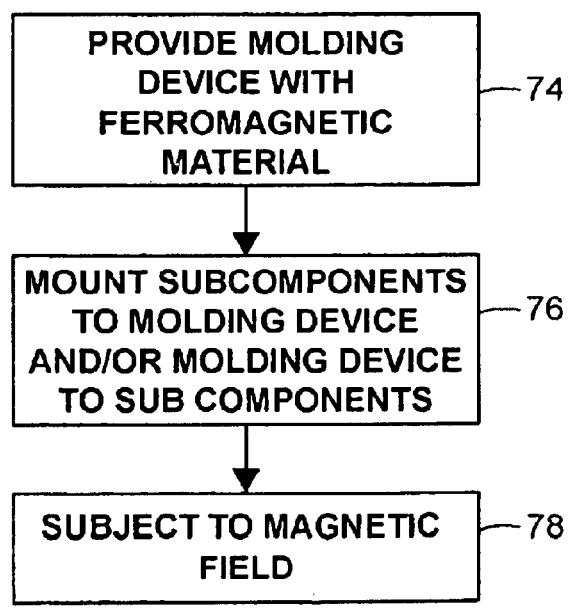
FIG. 5 is a flow chart depicting a sample sequence of steps which may be taken according to a second method taught by the disclosure.

Referring now to FIGS. 4 and 5, flow charts are provided to depict a sample sequence of steps which may be taken in connection with the apparatus described above and depicted in FIGS. 1–3. First with regard to the flowchart of FIG. 4, reference being simultaneously had to the apparatus of FIG. 1, a first step 66 may be to provide subcomponents such as the first polymeric material 22 and the second polymeric material 24. A second step 68 would be to provide the layer of ferromagnetic material 26. The step 68 may be accomplished by applying a paint with dissolved ferromagnetic particles. A third step 70 may be to then assemble the first and second polymeric layers 22, 24 with the ferromagnetic material 26 therebetween. Finally, a fourth step 72 would be to expose the first and second polymeric materials 22, 24 and ferromagnetic material 26 to the magnetic field 28 by, for example, energizing the anode and cathode 30, 32. The magnetic field 28 causes vibration of the ferromagnetic material 26, with the resulting hysteresis losses causing the ferromagnetic material 26 to rise in temperature, and accordingly for the first and second polymeric materials 22, 24 to rise in temperature as well. By matching the Curie temperature of the ferromagnetic material 26 to the melting points of the first and second polymeric materials 22, 24, the polymers are heated to a temperature sufficient to allow for them to fuse together, without overheating the materials.

As shown in FIG. 5, the apparatus of FIGS. 2 and 3 can be used according to the following method. A first step 74 is to provide the molding device 34 with the ferromagnetic material already therein. As indicated above, this can be accomplished by painting an inner or outer surface of the molding device 34 with the ferromagnetic material, dipping the molding device in the ferromagnetic material, molding or otherwise fabricating the molding components to have the ferromagnetic material already therein, or the like. A second step 76 may then be to mount the subcomponents to the molding device 34, or the molding device 34 to the subcomponents. More specifically, the first polymer 50 may be mounted to the mandrel 38, with the second polymer 52 then being mounted to the outside of the first polymer 50. The first and second polymeric materials 50, 52, and the mandrel 38 may all be placed inside the clam shell 36. A third and final step 78 may then be to subject the assembly to the magnetic field 58 as by energizing the anode and cathode 60, 62 and heating the components to the Curie temperature of the ferromagnetic material as indicated above.

In the embodiments depicted in FIGS. 2 and 3, it will be clear that choosing a specific ferromagnetic substance with a first Curie temperature to be applied on the mandrel that matches a melting polymer on the inner layer of the tube construction, and a second ferromagnetic material with a second Curie temperature for the clam shell which is the melting temperature of the outer polymer layer, will allow polymers with different melting temperatures to be welded more easily than by choosing a welding system with one temperature setting. From the foregoing, one of ordinary skill in the art will recognize that the apparatus, as disclosed herein, provides for a polymeric fusing or bonding technique and an apparatus that enables for rapid and controllable temperature elevation.

What is claimed is:

1. A method of bonding multiple polymeric elements using a molding device comprising first and second mold components, the first mold component designed to hold the multiple polymeric elements and the second mold component, the method comprising:

distributing a first set of ferromagnetic particles comprising a first Curie temperature through the first mold component, and a second set of ferromagnetic particles comprising a second Curie temperature, different from the first Curie temperature, through the second mold component;

placing first and second polymeric elements into operative association with the molding device with the first and second polymeric elements between the first and second mold components;

exposing the molding device to an electromagnetic field, thereby heating the molding device; and heating and bonding the polymeric elements by way of contact with the molding device.

2. The method of claim 1, wherein the first mold component is a clam shell mold.

3. The method of claim 1, wherein the second mold component is a mandrel.

4. The method of claim 1, wherein the ferromagnetic particles are selected from the group consisting of $Fe_3O_4$, $Fe_2O_3$, $Cr_2O_3$, and $FeCr_2O_4$.

5. The method of claim 1, wherein the ferromagnetic particles have sizes in the range of about five nanometers to about one hundred nanometers.

6. The method of claim 1, wherein the distributing step involves the step of forming any one of the mold components from a material with the ferromagnetic particles mixed therein.

7. The method of claim 1, wherein the distributing step involves the step of applying a layer of the ferromagnetic particles to an outside surface of any one of the mold components.

8. The method of claim 7, wherein the applying step is performed by painting the outside surface of any one of the mold components.

9. The method of claim 1, wherein the heating step is performed up to at least any one of the Curie temperatures of the ferromagnetic particles.

10. The method of claim 1, wherein the first Curie temperature is about equal to or greater than a melting point of a first polymeric element, and the second Curie temperature is about equal to or greater than a melting point of a second polymeric element.

11. The method of claim 1, wherein the first Curie temperature is greater than the second Curie temperature.

12. The method of claim 1, wherein the second Curie temperature is greater than the first Curie temperature.

13. The method of claim 1, wherein the polymeric elements consist of or are comprised by catheter components.

14. The method of claim 1, wherein any one of the polymeric elements comprises or forms part of a catheter balloon.

15. The method of claim 1, wherein the first mold component comprises a surface complementary to the shape of a balloon catheter.

16. The method of claim 1, wherein any set of ferromagnetic particles is distributed in rings longitudinally along any one of the mold components.

17. The method of claim 1, wherein any set of ferromagnetic particles is distributed along any one of the mold components in those areas where bonding is desired.

18. The method of claim 1, further comprising the step of applying a third set of ferromagnetic particles between the first and second polymeric elements.

19. The method of claim 1, wherein the first polymer element is between the first mold component and the second polymer element, and the second polymer element is between the first polymer element and the second mold component.

20. The method of claim 1, wherein any one of the first and second sets of ferromagnetic particles is distributed in both the first and the second mold components.

21. The method of claim 1, wherein both sets of ferromagnetic particles are distributed in both the first and the second mold components.

22. The method of claim 1, wherein the first set of polymeric material is distributed in a first region of the first mold component and in a first region of the second mold component, the second set of polymeric material is distributed in a second region of the first mold component and a second region of the second mold component, wherein the first polymer element is operatively associated with the first regions and the second polymer element is operatively associated with the second regions.

23. A method of bonding a balloon catheter using a molding device comprising a clam shell mold and a mandrel, the method comprising:

distributing a first set of ferromagnetic particles comprising a first Curie temperature about equal to or greater than a melting temperature of a first polymeric element through the clam shell mold, and a second set of ferromagnetic particles comprising a second Curie temperature about equal to or greater than a melting temperature of a second polymeric element through the mandrel, placing first and second polymeric elements into operative association with the molding device with the polymeric elements between the clam shell mold and the mandrel;

exposing the molding device to an electromagnetic field, thereby heating the molding device; and heating and bonding the polymeric elements by way of contact with the molding device.

24. The method of claim 23, wherein the first polymeric element comprises an outer layer of a balloon catheter and the second polymeric element comprises an inner layer of a balloon catheter.

* * * * *